(12) United States Patent
Wietfeldt et al.

(10) Patent No.: US 9,743,440 B2
(45) Date of Patent: Aug. 22, 2017

(54) LINK SELECTION FOR DEVICE-TO-DEVICE COMMUNICATIONS

(71) Applicant: QUALCOMM Incorporated, San Diego, CA (US)

(72) Inventors: Richard Dominic Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 14/713,966

(22) Filed: May 15, 2015

(65) Prior Publication Data
US 2016/0338121 A1 Nov. 17, 2016

(51) Int. Cl.
*H04W 76/02* (2009.01)
*H04L 29/08* (2006.01)
(Continued)

(52) U.S. Cl.
CPC ......... *H04W 76/023* (2013.01); *H04L 67/104* (2013.01); *H04W 8/005* (2013.01);
(Continued)

(58) Field of Classification Search
None
See application file for complete search history.

(56) References Cited

U.S. PATENT DOCUMENTS 8,427,973 B2 * 4/2013 Choi ............... H04W 48/18
370/252
8,902,855 B2 12/2014 Etemad et al.
(Continued)

FOREIGN PATENT DOCUMENTS

WO 2014102335 A1 7/2014
WO 2014158135 A1 10/2014
(Continued)

OTHER PUBLICATIONS

International Search Report and Written Opinion—PCT/US2016/027758—ISA/EPO—Jul. 8, 2016.
(Continued)

*Primary Examiner* — Bunjob Jaroenchonwanit
(74) *Attorney, Agent, or Firm* — MG-IP Law, P.C.

(57) ABSTRACT

The disclosure generally relates to negotiating a best device-to-device (D2D) radio access technology (RAT) to use in a D2D connection. In particular, two wireless devices that correspond to potential D2D peers may exchange respective radio configurations according to a D2D coexistence protocol to mutually negotiate the "best" RAT to use in the D2D connection, wherein the exchanged radio configurations may comprise at least radio capabilities and coexistence states (e.g., in-device and/or cross-device coexistence states) associated with the respective wireless devices. The potential D2D peers may then negotiate one or more compatible RATs that are available to use in the D2D connection according to at least the radio capabilities and the in-device and cross-device coexistence states exchanged therebetween. As such, the two wireless devices may then establish one or more D2D connections using the negotiated compatible RAT(s).

30 Claims, 8 Drawing Sheets

(51) Int. Cl.
*H04W 8/00* (2009.01)
*H04W 88/06* (2009.01)
*H04W 72/08* (2009.01)
*H04W 72/12* (2009.01)
*H04W 76/04* (2009.01)
*H04W 28/18* (2009.01)

(52) U.S. Cl.
CPC ..... *H04W 72/082* (2013.01); *H04W 72/1215* (2013.01); *H04W 88/06* (2013.01); *H04W 28/18* (2013.01); *H04W 76/043* (2013.01)

(56) References Cited

U.S. PATENT DOCUMENTS

| | | | | |
|---|---|---|---|---|
| 8,995,359 B2 * | 3/2015 | Dayal | ............... | H04W 36/0055 370/329 |
| 2008/0146227 A1 * | 6/2008 | Wu | ............ | H04W 16/06 455/435.1 |
| 2013/0235814 A1 * | 9/2013 | Wietfeldt | .......... | H04W 16/14 370/329 |
| 2013/0331137 A1 * | 12/2013 | Burchill | ............ | H04W 52/243 455/501 |
| 2014/0057667 A1 * | 2/2014 | Blankenship | ......... | H04L 67/303 455/500 |
| 2015/0189685 A1 * | 7/2015 | Yao | ................ | H04W 76/023 455/426.1 |
| 2015/0215833 A1 * | 7/2015 | Siomina | ............... | H04W 36/08 455/436 |
| 2015/0296526 A1 * | 10/2015 | Behravan | ............ | H04W 16/14 370/329 |
| 2015/0323981 A1 * | 11/2015 | Yarvis | ................... | G06F 1/3293 713/323 |
| 2016/0029424 A1 * | 1/2016 | Li | ....................... | H04W 76/023 370/329 |
| 2016/0050703 A1 * | 2/2016 | Johnsson | ............. | H04W 8/005 370/329 |
| 2016/0143074 A1 | 5/2016 | Wietfeldt et al. | | |
| 2016/0302052 A1 * | 10/2016 | Xu | ....................... | H04W 8/005 |
| 2016/0360559 A1 | 12/2016 | Chrisikos et al. | | |

FOREIGN PATENT DOCUMENTS

WO 2015003125 A2 1/2015
WO 2015110991 A1 7/2015

OTHER PUBLICATIONS

Kim D-Y., et al., "Spectrum Coordination of Multi-RAT D2D for IoT Service," 2015 International Conference on Information and Communication Technology Convergence (ICTC), IEEE, Oct. 28, 2015 (Oct. 28, 2015), pp. 671-673, XP032829935, DOI: 10.1109/ICTC.2015.7354635 [retrieved on Dec. 11, 2015].

* cited by examiner

LINK SELECTION FOR DEVICE-TO-DEVICE COMMUNICATIONS

TECHNICAL FIELD

The various aspects and embodiments described herein generally relate to device-to-device (D2D) or peer-to-peer (P2P) communications, and in particular, to negotiating a best D2D/P2P radio access technology to use in a D2D/P2P connection according to one or more policies based on performance, power, coexistence, preference, and/or other criteria.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Example cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) TDMA variation, and newer hybrid digital communication systems that use both TDMA and CDMA technologies. More recently, Long Term Evolution (LTE) has been developed as a wireless communications protocol for wireless communication of high-speed data for mobile phones and other data terminals. LTE is based on GSM, and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

Accordingly, communications systems and devices are becoming increasingly diverse with new technological advancements. Many communications devices can now support various different communications technologies and protocols. Indeed, not only can various communications devices operate in a communications system (e.g., over a network infrastructure), many communications device may communicate with one another using direct device-to-device (D2D) communications when located in sufficient proximity to one another. For example, communications devices that support the Wi-Fi Direct standard may connect to each other via a D2D connection and communicate at typical Wi-Fi speeds with minimal setup and without requiring any intermediate wireless access point. Furthermore, the LTE Direct standard uses licensed spectrum and the LTE physical layer to provide a scalable and universal framework through which equipped communications devices can discover and connect to proximate peers and thereby establish D2D connections within ranges up to approximately 500 meters, whereas Wi-Fi direct tends to require the devices to be in closer proximity. Further still, wireless devices operating in the "Bluetooth" wireless communication spectrum can engage in D2D communication over relatively short distances, with an operating range ranging from a few meters to a few tens of meters, and near-field communication (NFC) technology refers to an open-platform, standard-based, short-range, high-frequency wireless communication technology that enables a bidirectional information exchange between NFC-equipped devices via magnetic field induction over very small distances (e.g., about ten centimeters). In any particular device, one or more D2D connections may be active at a given time, including at a time when the device may have a concurrent connection with one or more infrastructure elements (e.g., a WLAN access point, a cellular base station, etc.).

As such, D2D communications are becoming increasingly popular and multiple schemes already exist (with more continuing to emerge) because D2D communications can be faster, more efficient, more private, or otherwise advantageous to end users. Moreover, network operators and end users can realize substantial benefits from using D2D communications rather than communicating over a network infrastructure, especially when two or more devices seeking to communicate are located in proximity to one another and can establish a D2D connection with reasonably good quality. However, current D2D schemes typically select one technology (e.g., Wi-Fi Direct) that may be fastest or most ubiquitous. However, the default technology selection to use in a D2D connection may be unavailable or suboptimal under certain circumstances. For example, certain technologies may be incompatible across devices from different manufacturers, provide insufficient performance with respect to a particular communication session (e.g., a large file to be transferred), and/or cause coexistence issues in the devices that communicate over the D2D connection, including in-device and/or cross-device coexistence issues.

More particularly, as mentioned above, many wireless devices include multiple radios that each support a different radio access technology (RAT) that can be used to transmit and receive data. For example, the RATs that can be supported on a multi-radio device may include UMTS, GSM, CDMA2000, WiMAX, WLAN (e.g., Wi-Fi), LTE, and the like, and the multi-radio device may further have different radios that each support a different D2D RAT, which may include NFC, Bluetooth, Wi-Fi Direct, LTE Direct, and the like. Accordingly, an example multi-radio device may have multiple radios that operate simultaneously to provide various different functions. While the different radios may provide useful functionalities to a user, inclusion in a single device may give rise to in-device coexistence issues where one radio may interfere with another radio through radiative, conductive, resource collision, and/or other interference mechanisms. Furthermore, D2D communications may create cross-device coexistence issues through similar interference mechanisms due at least in part to the proximity between the devices communicating over the D2D connection. For example, the LTE uplink channel is adjacent to the industrial scientific and medical (ISM) band and may cause interference with Bluetooth and some wireless LAN (WLAN) channels that fall within the ISM band. In some instances, a Bluetooth error rate can become unacceptable when LTE is active in some channels within Band 7 or even Band 40 even though there may not be a significant degradation to LTE because simultaneous operation with Bluetooth can disrupt voice services terminating in a Bluetooth headset, which may be unacceptable to consumers.

Accordingly, solutions to select an optimal RAT to use in a D2D connection to mitigate coexistence issues and meet performance requirements are needed.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, in a wireless environment where two wireless devices are located in sufficient proximity to, the two wireless devices may negotiate a best radio access technology (RAT) to use in establishing a D2D connection. For example, in various embodiments, the two wireless devices may each have multiple wireless radios, which may include a near-field communication (NFC) radio, a wireless wide area network (WWAN) radio, a wireless local area network (WLAN) radio, a Bluetooth radio, and/or other suitable radios. As such, the particular radio(s) that the wireless devices use to communicate may cause in-device coexistence issues and/or cross-device coexistence issues. For example, in-device coexistence issues may occur at a local level within each respective wireless device due to interference or other coexistence impacts that may be caused when the respective wireless device(s) use more than one radio to communicate at substantially the same time. Furthermore, when the wireless devices are within sufficient proximity, the radio(s) that the wireless devices use to conduct wireless communication operations may cause cross-device coexistence issues. As such, depending on the particular radios available and/or in use at the wireless devices seeking to establish the D2D connection, there may be several factors to consider in choosing the best RAT to form the D2D connection, including at least the in-device coexistence impacts and the cross-device coexistence impacts that such a D2D link may cause. As such, the various aspects and embodiments described herein may provide various solutions that can be used to identify the best RAT(s) to use in establishing the D2D connection due to the possibility that the wireless devices may each support one or several RATs that can be used to establish the D2D connection.

For example, according to various aspects, the solutions described herein may involve a negotiation between two wireless devices to select the best RAT and/or multi-radio parameters to use when establishing a D2D connection based on various factors, which may include the particular radio configurations associated with the wireless devices, the available RAT options that can be used to establish the D2D connection, criteria that relate to performance, power, preferences, in-device coexistence impacts, cross-device coexistence impacts, and so on. As such, in various embodiments, the wireless devices may each have a respective coexistence manager and policy database, which the wireless devices may use to run a D2D coexistence protocol and thereby mutually negotiate the "best" RAT to use in establishing a D2D connection. For example, in various embodiments, the D2D coexistence protocol may comprise the wireless devices exchanging radio configurations and radio capabilities associated with one another to learn the compatible D2D RATs that can be used to establish the D2D connection (i.e., the possible RATs that the wireless devices can use to establish the D2D connection using locally implemented versions on the respective wireless devices) and further to learn a multi-radio coexistence state associated with each other (e.g., in-device and cross-device coexistence states). The wireless devices may then mutually negotiate the best RAT to establish the D2D connection based on the compatible D2D RATs and the multi-radio coexistence state(s) exchanged therebetween, among other factors.

According to various aspects, a method for selecting a RAT to use in a D2D connection may comprise requesting, by a first wireless device, a radio configuration from a second wireless device, wherein the requested radio configuration comprises a coexistence state and one or more radio capabilities associated with the second wireless device, receiving, at the first wireless device, the coexistence state and the one or more radio capabilities from the second wireless device, negotiating one or more compatible RATs available to use in a D2D connection between the first wireless and the second wireless device according to at least the coexistence state and the one or more radio capabilities received from the second wireless device, wherein the negotiating may comprise exchanging in-device and cross-device coexistence states between the first wireless device and the second wireless device, and establishing one or more D2D connections between the first wireless device and the second wireless device using the negotiated one or more compatible RATs. For example, in various embodiments, negotiating the one or more compatible RATs may further comprise determining that at least one of the compatible RATs causes in-device and/or cross-device interference at one or more of the first wireless device or the second wireless device based on the exchanged in-device and cross-device coexistence states, negotiating a modified configuration associated with the at least one compatible RAT to mitigate the in-device and/or cross-device interference, and adjusting a multi-radio configuration at the first wireless device according to the negotiated modified configuration associated with the at least one compatible RAT, wherein the second wireless device may likewise adjust the radio configuration associated therewith according to the modified configuration. Furthermore, in various embodiments, negotiating the one or more compatible RATs may further comprise determining that one compatible RAT is available to use in the D2D connection between the first wireless and the second wireless device, in which case the one or more D2D connections between the first wireless device and the second wireless device may comprise one D2D connection established according to the one compatible RAT. Alternatively, in response to determining that multiple compatible RATs are available to use in the D2D connection between the first wireless and the second wireless device, the method may further comprise selecting one or more of the multiple compatible RATs to meet a performance requirement associated with the D2D connection, which may be performed according to a priority list that orders the multiple compatible RATs according to one or more policies that are based on one or more of a user preference, a device state, or a mobile network operator preference.

According to various aspects, a wireless device may comprise multiple radios that each support a different RAT, a transmitter configured to transmit a request to a target peer wireless device, a receiver configured to receive a coexistence state and one or more radio capabilities associated with the target peer wireless device in response to the transmitted request, and one or more processors configured to exchange in-device and cross-device coexistence states between the wireless device and the target peer wireless device, negotiate one or more compatible RATs available to use in a D2D connection between the wireless and the target peer wireless device according to the exchanged in-device and cross-device coexistence states, and establish one or more D2D connections between the wireless device and the target peer wireless device using the negotiated one or more compatible RATs.

According to various aspects, an apparatus may comprise means for requesting a radio configuration from a target peer wireless device, wherein the requested radio configuration may comprise a coexistence state and one or more radio capabilities associated with the target peer wireless device, means for receiving the coexistence state and the one or more radio capabilities from the target peer wireless device, means for negotiating one or more compatible RATs available to use in a D2D connection with the target peer wireless device according to at least the coexistence state and the one or more radio capabilities received from the target peer wireless device, wherein the means for negotiating may comprise means for exchanging in-device and cross-device coexistence states with the target peer wireless device, and means for establishing one or more D2D connections with the target peer wireless device using the negotiated compatible RATs.

According to various aspects, a computer-readable storage medium may have computer-executable instructions recorded thereon, wherein executing the computer-executable instructions on a wireless device having one or more processors may cause the one or more processors to request a radio configuration from a target peer wireless device (e.g., a coexistence state and one or more radio capabilities associated with the target peer wireless device), receive the coexistence state and the one or more radio capabilities from the target peer wireless device, negotiate one or more compatible RATs available to use in a D2D connection with the target peer wireless device according to at least the coexistence state and the one or more radio capabilities received from the target peer wireless device and in-device and cross-device coexistence states exchanged with the target peer wireless device, and establish one or more D2D connections with the target peer wireless device using the negotiated one or more compatible RATs.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
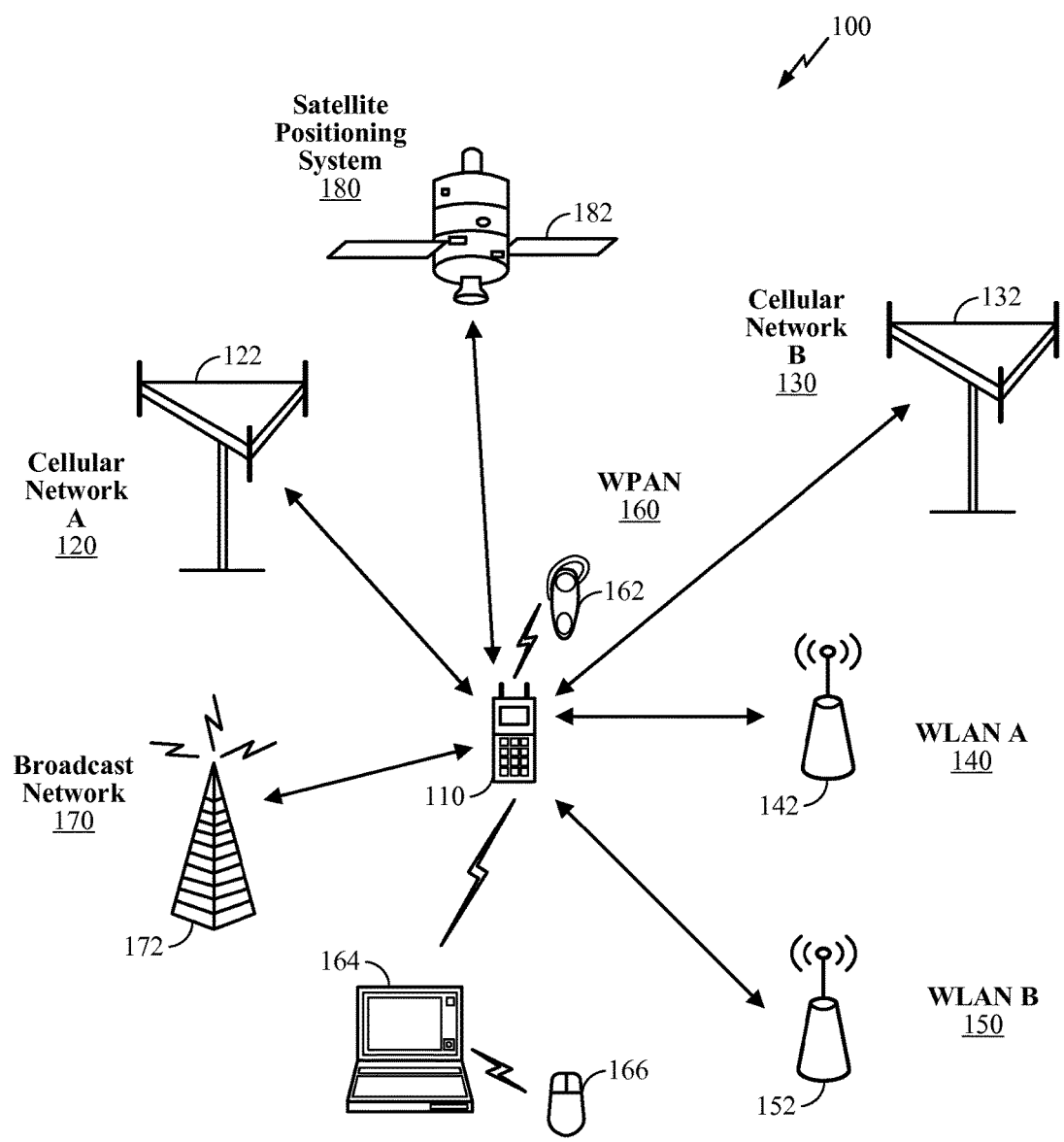
FIG. 1 illustrates an exemplary wireless communication environment in which various aspects and embodiments described herein can function.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used in connection with various wireless communication systems such as CDMA, TDMA, FDMA, OFDMA, and SC-FDMA systems.

The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

FIG. 1 illustrates an exemplary wireless communication environment in which various aspects and embodiments described herein can function. In various embodiments, the wireless communication environment 100 shown in FIG. 1 can include a wireless device 110, which can have capabilities to communicate with multiple communication systems. For example, the wireless device 110 may have capabilities that support communication with one or more cellular networks 120 and/or 130, one or more WLAN networks 140 and/or 150, a wireless personal area network (WPAN) 160, one or more broadcast networks 170, one or more satellite positioning systems 180, other systems and/or networks not shown in FIG. 1, or any combination thereof, wherein the terms "network" and "system" may be used interchangeably in the following description.

In various embodiments, the cellular networks 120 and 130 can each be a CDMA, TDMA, FDMA, OFDMA, single carrier FDMA (SC-FDMA), or other suitable network. A CDMA network can implement a RAT such as universal terrestrial radio access (UTRA), CDMA2000, etc. UTRA includes wideband CDMA (WCDMA) and other variants of CDMA. Moreover, CDMA2000 covers IS-2000 (CDMA2000 1×), IS-95 and IS-856 (HRPD) standards. A TDMA network can implement a RAT such as global system for mobile communications (GSM), digital advanced mobile phone system (D-AMPS), etc. An OFDMA network can implement a RAT such as evolved UTRA (E-UTRA), ultra mobile broadband (UMB), IEEE 802.16 (WiMAX), IEEE 802.20, Flash-OFDM®, etc. UTRA and E-UTRA are part of universal mobile telecommunication system (UMTS). 3GPP long term evolution (LTE) and LTE-Advanced (LTE-A) are more recent releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). In an aspect, the cellular network 120 can include a number of base stations 122, which can support bi-directional communication for wireless devices within their coverage. Similarly, the cellular network 130 can include a number of base stations 132 that can support bi-directional communication for wireless devices within their coverage.

WLAN networks 140 and 150 can respectively implement RATs such as IEEE 802.11 (Wi-Fi), Hiperlan, etc. The WLAN network 140 can include one or more access points 142 that can support bi-directional communication. Similarly, the WLAN network 150 can include one or more access points 152 that can support bi-directional communication. The WPAN network 160 can implement a RAT such as Bluetooth (BT), Bluetooth Low Energy (BTLE), IEEE 802.15, etc. Further, the WPAN network 160 can support bi-directional communication for various devices such as wireless device 110, a headset 162, a computer 164, a mouse 166, or the like.

The broadcast network 170 can be a television (TV) broadcast network, a frequency modulation (FM) broadcast network, a digital broadcast network, etc. A digital broadcast network can implement a RAT such as MediaFLO™, digital video broadcasting for handhelds (DVB-H), integrated services digital broadcasting for terrestrial television broadcasting (ISDB-T), or the like. Further, the broadcast network 170 can include one or more broadcast stations 172 that can support one-way communication.

The satellite positioning system 180 can be the United States Global Positioning System (GPS), the European Galileo system, the Russian GLONASS system, the quasi-zenith satellite system (QZSS) over Japan, the Indian Regional Navigational Satellite System (IRNSS) over India, the Beidou system over China, and/or any other suitable system. Further, the satellite positioning system 180 can include a number of satellites 182 that transmit signals for position determination.

In various embodiments, the wireless device 110 can be stationary or mobile and can also be referred to as a client device, user equipment (UE), user terminal, user device, communication device, wireless communications device, handheld device, mobile device, mobile terminal, mobile station, handset, access terminal, subscriber device, subscriber terminal, subscriber station, terminal, and/or variants thereof, which are used interchangeably to refer to any suitable mobile or stationary device that may operate that can communicate with a radio access network (RAN) that implements a particular radio access technology (RAT), over a wired network, over a Wi-Fi network (e.g., based on IEEE 802.11, etc.), and/or with other devices via direct device-to-device (D2D) and/or peer-to-peer (P2P) signaling protocols (e.g., LTE Direct, sometimes referred to as LTE Advanced, AllJoyn, Wi-Fi Direct, Wi-Fi Aware, Bluetooth, Bluetooth Low Energy (BTLE), NFC, etc.). For example, according to the various aspects and embodiments described herein, the wireless device 110 may discover the other devices via the D2D and/or P2P signaling protocols according to various methods, including technical specifications set forth by the 3rd Generation Partnership Project (3GPP) (e.g., 3GPP TS 23.303, "Proximity-based services (ProSe); Stage 2), the Wi-Fi Alliance (e.g., "Wi-Fi Peer-to-Peer Services Technical Specification"), etc. As such, the wireless device 110 can generally engage in two-way communication with the cellular system 120 and/or 130, the WLAN system 140 and/or 150, devices with the WPAN system 160, and/or any other suitable systems(s) and/or devices(s). The wireless device 110 can additionally or alternatively receive signals from the broadcast system 170 and/or satellite positioning system 180. In general, those skilled in the art will appreciate that the wireless device 110 can communicate with any number of systems and/or networks at any given moment, which may also cause the wireless device 110 to experience coexistence issues among various constituent radio devices associated therewith that may operate at the same time.

Accordingly, as will be explained in further detail herein, the wireless device 110 may include a coexistence manager (CxM, not shown) having one or more functional modules to detect and mitigate coexistence issues.

In particular, as will be explained in further detail herein, the terms "coexistence state," "coexistence impacts," "coexistence parameters," and/or variants thereof as used herein may generally represent the level of impact, including desense (e.g., lost sensitivity due to noise sources), for the radios on a given device and may include one or more inputs such as the operational radios, respective parameters associated with the operational radios such as transmit (TX) power level, operating frequencies, receiver sensitivities, throughput, timing, use cases, etc. Furthermore, according to various aspects, the terms "coexistence state," "coexistence impacts," "coexistence parameters," or the like as used herein may comprise secondary effects that can include temperature, process, and operational effects such as manufacturer filer variations, component aging, isolation variations (e.g., hand/object placement, channel conditions, etc.). As such, based on the above-mentioned information and/or other relevant factors, the impacts to one or more receive radios can be determined. Furthermore, according to the various aspects and embodiments described herein, the coexistence state for a given device may be stored in a database, a lookup table, a memory, and/or any other suitable repository or data source accessible to the local device and represent all radios built into that device. In various embodiments, a manufacturer associated with the device may pre-populate the database, lookup table, memory, etc. at build time, or the database, lookup table, memory, etc. may alternatively (or additionally) be created and/or updated during operations. Furthermore, according to various aspects, the coexistence state, impacts, parameters, etc. may be shared with one or more adjacent devices or other proximally located devices for the purposes described herein.

Figure 2:
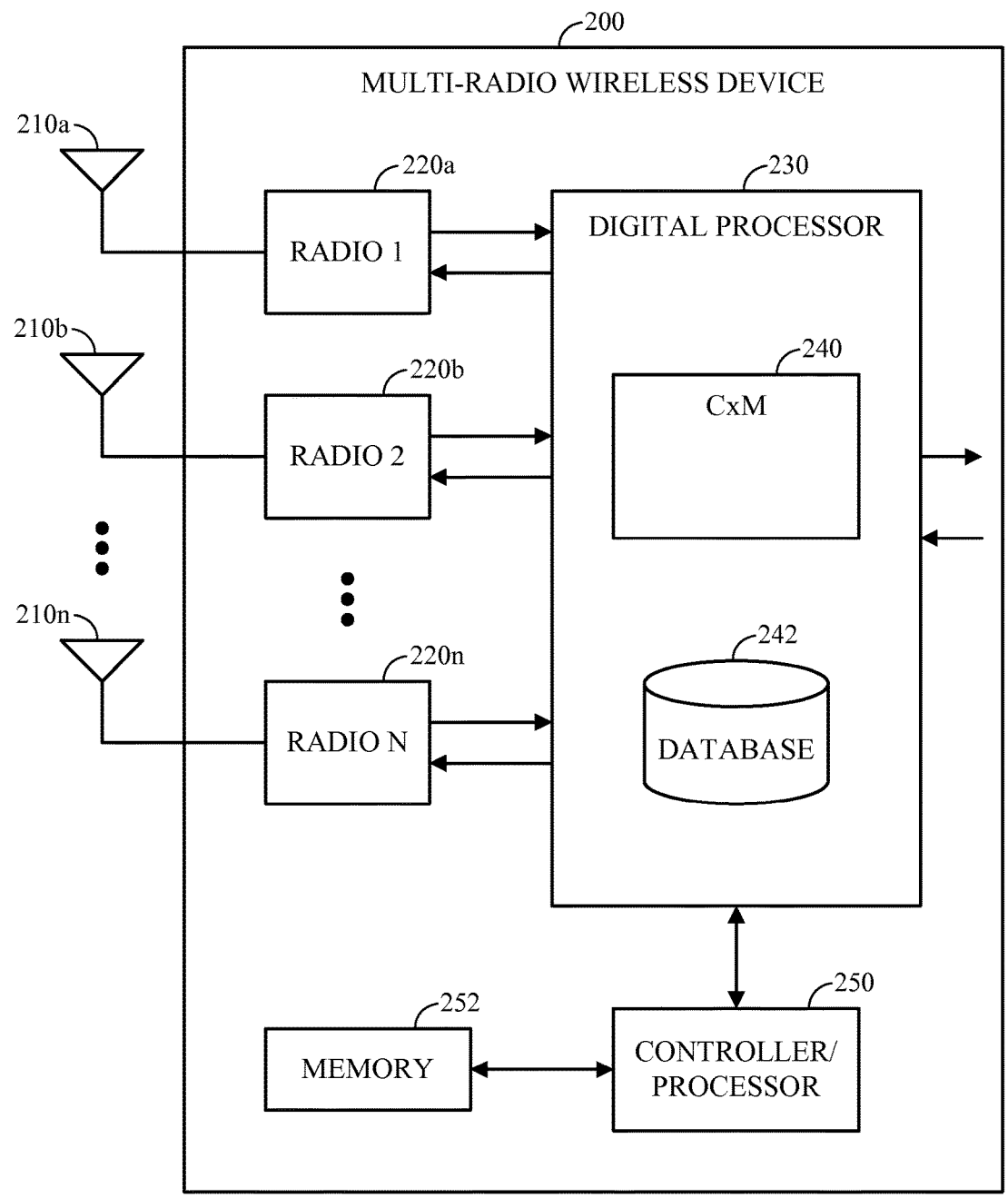
FIG. 2 illustrates an exemplary multi-radio wireless device that may support one or more device-to-device (D2D) communication technologies, according to various aspects.

According to various aspects, FIG. 2 illustrates an exemplary multi-radio wireless device that may support one or more device-to-device (D2D) communication technologies, according to various aspects. Turning next to FIG. 2, a block diagram is provided that illustrates an example design for a multi-radio wireless device 200 and may be used as an implementation of the wireless device 110 shown in FIG. 1. As illustrated in FIG. 2, the multi-radio wireless device 200 can include N radios 220a through 220n, which can be respectively coupled to N antennas 210a through 210n, where N can be any integer value. Those skilled in the art will appreciate, however, that the radios 220 can be coupled to any number of antennas 210 and/or share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, those skilled in the art will appreciate that a radio 220 can be utilized to support wireless communication. In another example, a radio 220 can also be a unit (e.g., a screen on a computer, a circuit board, etc.) that emits noise, which can impact the performance of other radios. Accordingly, those skilled in the art will further appreciate that a radio 220 can also be a unit that emits noise and interference without supporting wireless communication. In various embodiments, the respective radios 220 can support communication with one or more systems. Multiple radios 220 can additionally or alternatively be used for a given system (e.g., to transmit or receive on different frequency bands, such as cellular and PCS bands).

In another aspect, a digital processor 230 can be coupled to radios 220a through 220n and can perform various functions, such as processing for data being transmitted or received via the radios 220. The processing for each radio 220 can be dependent on the radio technology supported by that radio and can include encryption, encoding, modulation, etc., for a transmitter; demodulation, decoding, decryption, etc., for a receiver, or the like. In one example, the digital processor 230 can include a coexistence manager (CxM) 240 that can control operation of the radios 220 in order to improve the performance of the multi-radio wireless device 200 as generally described herein. The coexistence manager 240 can have access to a database 244, which can store information used to control the operation of the radios 220. As explained further below, the coexistence manager 240 can be adapted for a variety of techniques to decrease in-device interference between the radios and/or interference with one or more radios on another device in proximity to the multi-radio wireless device 200. In one example, the coexistence manager 240 may request a measurement gap pattern or DRX cycle that allows an ISM radio to communicate during periods of LTE inactivity.

For simplicity, digital processor 230 is shown in FIG. 2 as a single processor. However, those skilled in the art will appreciate that the digital processor 230 can include any number of processors, controllers, memories, etc. In one example, a controller/processor 250 can direct the operation of various units within the wireless device 200. Additionally or alternatively, a memory 252 can store program codes and data for the wireless device 200. The digital processor 230, controller/processor 250, and memory 252 can be implemented on one or more integrated circuits (ICs), application specific integrated circuits (ASICs), etc. By way of a specific, non-limiting example, the digital processor 230 can be implemented on a Mobile Station Modem (MSM) ASIC.

In an aspect, the coexistence manager 240 can manage operation of respective radios 220 utilized by multi-radio wireless device 200 in order to avoid interference and/or other performance degradation associated with collisions between respective radios 220 and/or with one or more radios on another device in proximity to the multi-radio wireless device 200. The coexistence manager 240 may perform one or more processes, such as those illustrated in FIG. 6 and FIG. 7, as will be described in further detail below.

Figure 3:
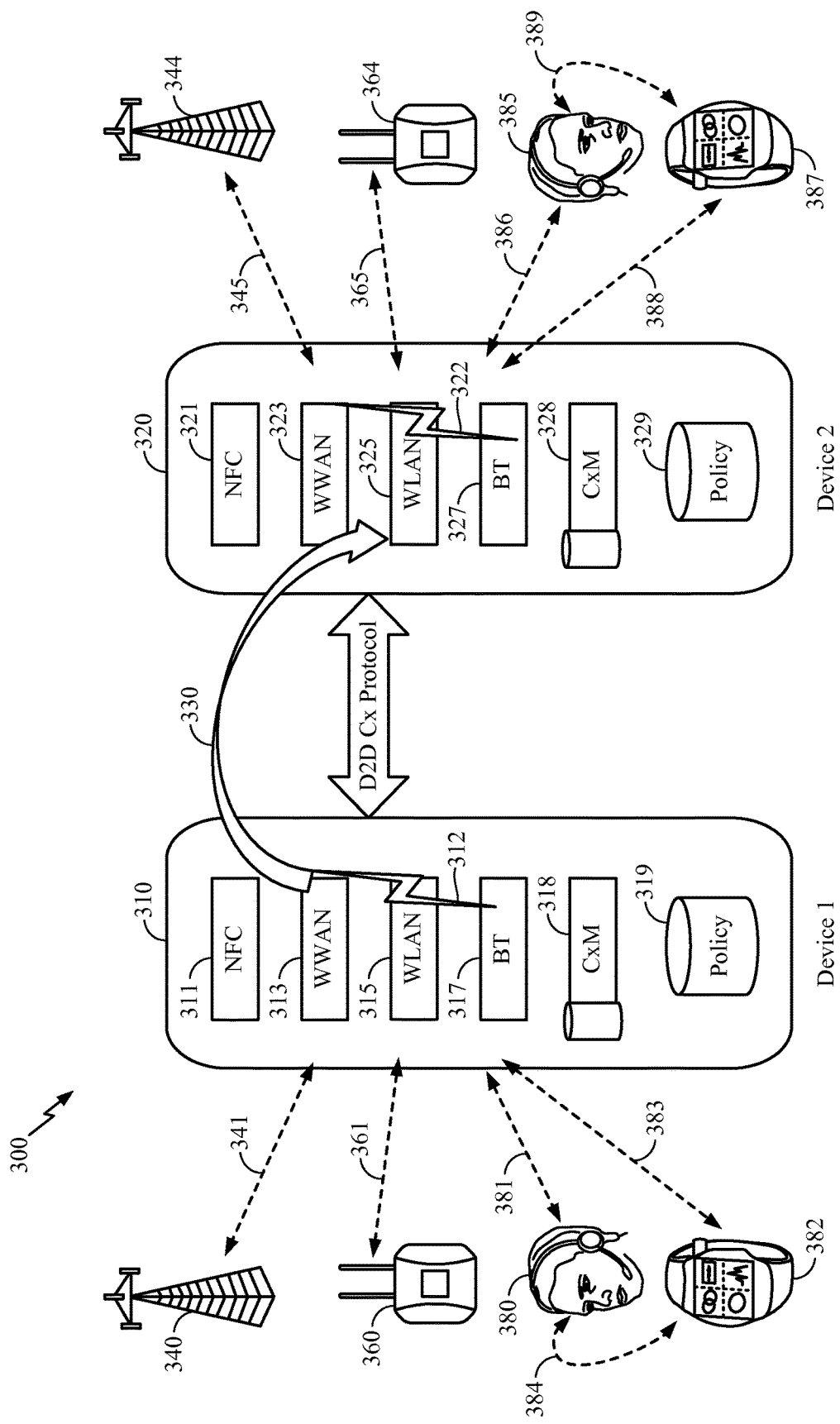
FIG. 3 illustrates an exemplary wireless environment in which two wireless devices may negotiate a best D2D radio access technology (RAT) to use in establishing a D2D connection, according to various aspects.

According to various aspects, FIG. 3 illustrates an exemplary wireless environment 300 in which two wireless devices 310, 320 that are located in sufficient proximity to one another may negotiate a best D2D radio access technology (RAT) to use in establishing a D2D connection. For example, in various embodiments, the two wireless devices 310, 320 may negotiate to derive a priority list that contains one or more best D2D RATs, one or more of which may be activated at a given time based on one or more requirements, preferences, policies, and/or other suitable criteria, as described in further detail herein.

More particularly, as shown in FIG. 3, the wireless device 310 may have a near-field communication (NFC) radio 311, a wireless wide area network (WWAN) radio 313, a wireless local area network (WLAN) radio 315, and a Bluetooth radio 317 that the wireless device 310 can use to communicate within the wireless environment 300. For example, as depicted in FIG. 3, the wireless device 310 can wirelessly communicate with a base station 340 over a WWAN link 341 using the WWAN radio 313. The wireless device 310 can also wirelessly communicate with an access point 360 over a WLAN link 361 using the WLAN radio 315. Furthermore, the wireless device 310 can wirelessly communicate with a Bluetooth headset 380 and Bluetooth-enabled wearable device 382 over Bluetooth links 381, 383 using the Bluetooth radio 317, wherein the Bluetooth headset 380 and the Bluetooth-enabled wearable device 382 may be in further wireless communication with each other over a Bluetooth link 384. Further still, the wireless device 310 can wirelessly communicate with one or more NFC devices (not shown) that are within the "near field" of the wireless device 310 using the NFC radio 311 via magnetic field induction.

Furthermore, in various embodiments, the wireless environment 300 may also include a second wireless device 320, which may likewise have multiple radios that each operate in accordance with a different RAT. For example, as shown in FIG. 3, the second wireless device 320 may also have an NFC radio 321, a WWAN radio 323, a WLAN radio 325, and a Bluetooth radio 327, wherein the wireless device 320 can use the radios 321, 323, 325, 327 to communicate within the wireless environment 300. For example, as depicted in FIG. 3, the wireless device 320 can wirelessly communicate with a base station 344 over a WWAN link 345 using the WWAN radio 323, with an access point 364 over a WLAN link 365 using the WLAN radio 325, with a Bluetooth headset 385 and a Bluetooth-enabled wearable device 387 over Bluetooth links 386, 388 using the Bluetooth radio 327, wherein the Bluetooth headset 385 and the Bluetooth-enabled wearable device 387 may be in further wireless communication with each other over a Bluetooth link 389. Further still, the wireless device 320 can wirelessly communicate with one or more NFC devices (not shown) that are within the "near field" of the wireless device 320 using the NFC radio 321 via magnetic field induction.

In various embodiments, those skilled in the art will appreciate that although the base stations 340, 344 are depicted as separate in FIG. 3, the wireless devices 310, 320 may in fact be in communication with the same base station, in which case the WWAN links 341, 345 may have a common endpoint. Analogously, those skilled in the art will appreciate that the access points 360, 364 may correspond to a single access point rather than separate access points as shown in FIG. 3.

Regardless of the particular arrangement, the various links that the wireless devices 310, 320 use to communicate within the wireless environment 300 may cause in-device coexistence issues and/or cross-device coexistence issues. For example, as depicted at 312, in-device coexistence issues may occur at the wireless device 310 due to interference or other coexistence impacts that may be caused when the wireless device 310 uses the WWAN radio 313, the WLAN radio 315, and the Bluetooth radio 317 to communicate at substantially the same time. In a similar respect, as depicted at 322, in-device coexistence issues may occur at the wireless device 320 due to interference or other coexistence impacts that result when the wireless device 320 uses the WWAN radio 323, the WLAN radio 325, and the Bluetooth radio 327 to communicate at substantially the same time. Further detail relating to example in-device coexistence impacts 312, 322 that may occur at the respective wireless devices 310, 320 will be described in further detail below with respect to FIG. 4. Furthermore, when the wireless devices 310, 320 are within sufficient proximity, the wireless devices 310, 320, certain cross-device coexistence issues may arise, as depicted at 330. For example, if the wireless devices 310, 320 are within a range up to approximately 500 meters, the wireless devices 310, 320 may use the WWAN radios 313, 323 to form a D2D link over LTE Direct. Furthermore, if the wireless devices 310, 320 are within sufficient range to discover one another via the WLAN radios 315, 325, the wireless devices 310, 320 may form a D2D link over Wi-Fi Direct. In other examples, the wireless devices 310, 320 may form a D2D link using the Bluetooth radios 317, 327 if the wireless devices 310, 320 are within an operating range ranging from a few meters to a few tens of meters or using the NFC radios 311, 321 if the wireless devices 310, 320 are within each other's near field (e.g., about ten centimeters or less). Further still, even if the wireless devices 310, 320 do not form a D2D link, the wireless communication that occurs at the respective wireless devices 310, 320 may create cross-device coexistence impacts 330 that interfere with wireless communication performed at the other wireless device (e.g., as will be described in further detail below with respect to FIG. 5). As such, depending on the particular radios available and/or in use at each wireless device 310, 320, there may be several factors to consider in choosing the best RAT to form a D2D link between the wireless devices 310, 320, including at least the in-device coexistence impacts 312, 322 and the cross-device coexistence impacts 330 that such a D2D link may cause.

Figure 4:
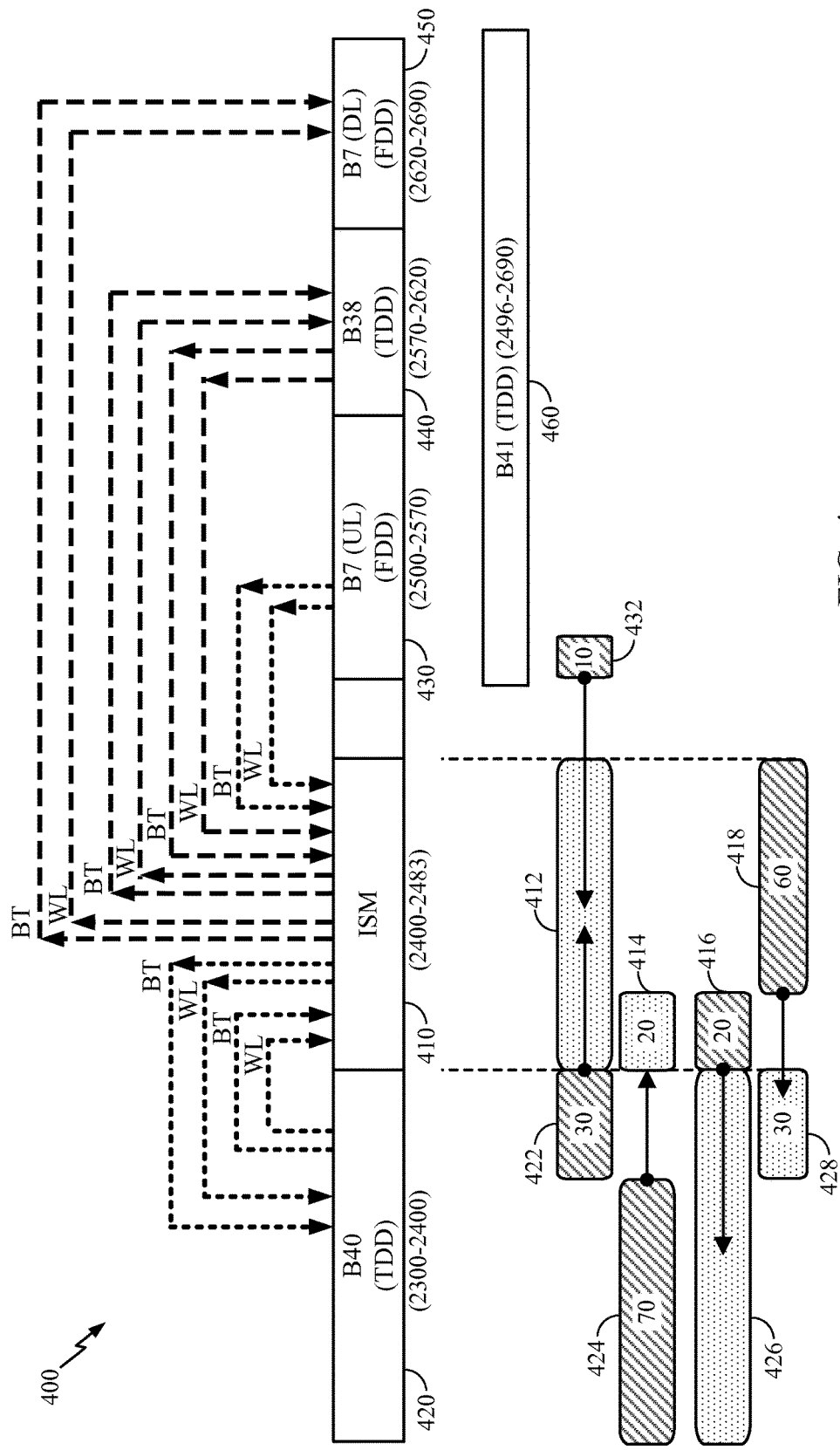
FIG. 4 illustrates example in-device coexistence impacts that may occur in the wireless environment shown in FIG. 3, according to various aspects.

For example, according to various aspects, FIG. 4 illustrates various examples relating to the possible in-device coexistence impacts 312, 322 that may occur in the wireless environment 300. More particularly, FIG. 4 shows an example frequency spectrum portion 400 that comprises several radio bands, including the industrial, scientific and medical (ISM) band 410. In that context, the example in-device coexistence impacts shown in FIG. 4 may apply to a particular situation in which coupling and/or isolation between antennas on a particular wireless device is the culprit that causes the in-device coexistence impacts. Furthermore, the various in-device coexistence impacts and regions in the frequency spectrum portion 400 shown in FIG. 4 apply to a particular scenario, and as such, may vary from one device to another depending on distance, filtering, device architectures, and/or other factors, as would be apparent to those skilled in the art.

As depicted in FIG. 4, the ISM radio band 410 has an 83 MHz bandwidth and covers frequencies ranging from 2400 MHz to 2483 MHz, wherein the ISM band 410 may commonly be positioned between other neighboring radio bands used to operate in accordance with 3rd Generation Partnership Project (3GPP) specifications. For example, as shown in FIG. 4, the 3GPP operating band 40 (hereinafter the "B40 band") 420 uses time-division duplexing (TDD) to operate on frequencies that range from 2300 MHz to 2400 MHz. Furthermore, as shown in FIG. 4, the 3GPP operating band 7 includes an uplink (UL) portion 430 (hereinafter the "B7 UL band") that uses frequency-division duplexing (FDD) to operate on frequencies ranging from 2500 MHz to 2570 MHz and a downlink (DL) portion 450 (hereinafter the "B7 DL band") that uses FDD to operate on frequencies ranging from 2620 MHz to 2690 MHz. In addition, between the B7 UL band 430 and the B7 DL band 450, the 3GPP operating band 38 (hereinafter the "B38 band") 440 uses TDD to operate on frequencies ranging from 2570 MHz to 2620 MHz, while the 3GPP operating band 41 (hereinafter the "B41 band") 460 uses TDD to operate on frequencies ranging from 2496 MHz to 2690 MHz. However, those skilled in the art will appreciate that the frequencies shown in FIG. 4 (and described herein) are approximations.

Accordingly, as shown in FIG. 4, the ISM band 410 is proximate to the B40 band 420, whereby there may be little to no guard band between the ISM band 410 and the B40 band 420. Furthermore, the ISM band 410 is also proximate to the B7 UL band 430 and the B41 band 460, and the ISM band 410 is less proximate to the B38 band 440 and the B7 DL band 450. However, as will be discussed in further detail below, operations in any of the various bands 410, 420, 430, 440, 450, 460 in the frequency spectrum portion 400 shown in FIG. 4 can potentially interfere with operations in one or more other bands in the illustrated frequency spectrum portion 400. As such, those skilled in the art will appreciate that FIG. 4 merely provides exemplary interference (or coexistence) issues that can arise in the frequency spectrum portion 400 shown therein. Moreover, those skilled in the art will appreciate that FIG. 4 may not provide a complete picture with respect to the potential interference (or coexistence) issues that may occur in the depicted frequency spectrum portion 400 and further that operations outside the depicted frequency spectrum portion 400 can further cause potential interference or coexistence issues with respect to operations that are within the depicted frequency spectrum portion 400 (and vice-versa). Accordingly, in-device and/or cross-device coexistence issues may arise across different RATs in any portion of the frequency spectrum, and the solutions described herein to select an appropriate D2D RAT in a manner that may mitigate such in-device and/or cross-device coexistence issues are generally applicable anywhere that the RAT used in a D2D connection may cause in-device and/or cross-device coexistence issues.

As noted above, FIG. 4 illustrates various example in-device coexistence impacts that may occur when the wireless devices 310, 320 shown in FIG. 3 establish a D2D connection using one or more RATs that operate in the illustrated frequency spectrum portion 400, wherein the examples shown in FIG. 4 may generally comprise in-device coexistence impacts between operations within the ISM band 410 and LTE operations outside the ISM band 410. However, as further mentioned above, the example in-device coexistence impacts and regions in the frequency spectrum portion 400 shown in FIG. 4 apply to a particular scenario, and as such, may vary from one device to another depending on distance, filtering, device architectures, and/or other factors. For example, the desensing depicted in FIG. 4 at 412, 414, 426, 428, etc. represents best-case results with high-performance a thin-film bulk acoustic resonator (FBAR) filter. Accordingly, in a device that uses a more typical and relatively cheaper surface acoustic wave (SAW) filter, entire portions of bands may be rendered inoperable, including the operations shown at 422, 432, 424, 416, 418 in addition to the desensing depicted at 412, 414, 426, 428 where high-performance FBAR filters are used. Furthermore, although the results shown in FIG. 4 represent example in-device coexistence impacts where the various RATs are designed for coexistence such that high-performance filters are used, the results could be much worse when encountering a cross-device victim/aggressor scenario where higher cost filters were not used in anticipation of possible coexistence problems. Further still, the results shown in FIG. 4 may depend on transmit power, receiver sensitivity, etc., and filters may also have performance variations due to temperature and process variation, further complicating coexistence mitigation efforts. As such, those skilled in the art will appreciate that any particular values referred to herein and any particular in-device and/or cross-device coexistence impacts described herein are merely illustrative with respect to the particular scenarios depicted and described, as there will be many different factors that can cause in-device and/or cross-device coexistence impacts between two wireless devices seeking to establish a D2D connection.

For example, in the particular scenario shown in FIG. 4, LTE operations 432 that are conducted in the B7 UL band 430 and use the closest channel to the ISM band 410 (e.g., the lowest 10 MHz in the B7 UL band) can cause in-device coexistence impacts whereby Bluetooth and/or WLAN operations may be desensed across the ISM band 410, as depicted at 412 (e.g., the LTE operations 432 in the B7 UL band 430 may desense WLAN channel 11 by ~30 decibels (dB), wherein the desensing shown at 412 can be more or less than 30 dB depending on circumstances). In another example, LTE operations that use the top 30 MHz in the B40 band 420, as depicted at 422, can cause in-device coexistence impacts whereby Bluetooth and/or WLAN operations may be desensed across the ISM band 410, as further depicted at 412. However, LTE operations in the bottom 70 MHz in the B40 band 420, as depicted at 424, may cause a smaller in-device coexistence impact, whereby desensing may only be experienced in the lower 20 MHz in the ISM band 410, as depicted at 414. Furthermore, Bluetooth and/or WLAN operations within the ISM band 410 can cause coexistence impacts outside the ISM band 410. For example, Bluetooth and/or WLAN operations that use the lower 20 MHz in the ISM band 410, as depicted at 416, can cause an in-device coexistence impact in that LTE operations may be desensed across the entire B40 band 420, as depicted at 426. However, Bluetooth and/or WLAN operations conducted above ~2420 MHz, as depicted at 418, may cause a relatively smaller in-device coexistence impact, whereby desensing may only be experienced in the upper 30 MHz in the B40 band 420, as depicted at 428. Again, as mentioned above, those skilled in the art will appreciate that the in-device coexistence impacts shown in FIG. 4 and the degree to which such in-device coexistence impacts may cause desensing due to operations in different RATs may vary based on many factors, which may include filter parameters, transmit power, and receiver sensitivity levels, among many other factors.

Figure 5:
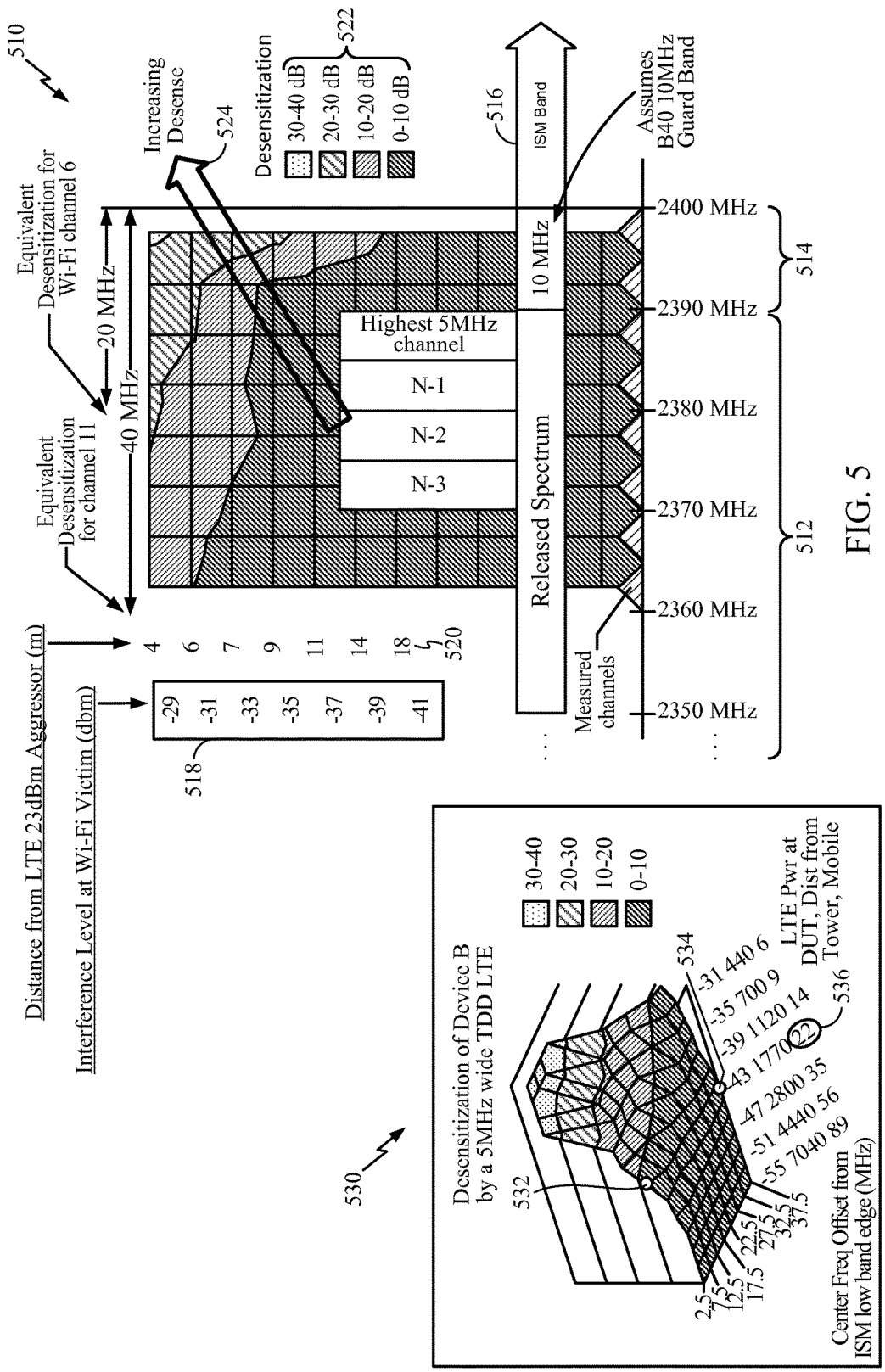
FIG. 5 illustrates example cross-device coexistence impacts that may occur in the wireless environment shown in FIG. 3, according to various aspects.

Furthermore, referring now to FIG. 5, illustrates example cross-device coexistence impacts that may occur in the wireless environment 300 shown in FIG. 3. More particularly, the graph depicted at 510 may generally illustrate cross-device coexistence impacts where LTE operations that a first wireless device (e.g., wireless device 310) conducts in a released spectrum portion 512 within the B40 band may cause interference and/or desensing at a second wireless device (e.g., wireless device 320) conducting Wi-Fi operations in the ISM band 516, wherein the example shown at 510 may assume a 10 MHz guard band 514 between the ISM band 516 and the released spectrum portion 512 in the B40 band, wherein the released spectrum portion 512 may typically extend all the way down to 2300 MHz and all the way up to 2400 MHz (e.g., without the guard band 514). Accordingly, in the illustrated example that assumes the 10 MHz guard band 514 between the ISM band 516 and the released spectrum portion 512 in the B40 band, the first wireless device may conduct the LTE operations in the released spectrum portion 512 in the B40 band between ~2300 MHz to 2390 MHz. Furthermore, in the example illustrated in FIG. 5, the measured channels in the B40 band generally range from ~2360 MHz to ~2400 MHz because experimental results and analysis did not reveal significant problems in the lower channels in the B40 band, as can be extrapolated from the cross-device coexistence impacts shown in FIG. 5.

Accordingly, in the following description, the first wireless device conducting the LTE operations in the released spectrum portion 512 within the B40 band may be referred to as an "LTE 23 dBm aggressor" and the second wireless device that conducts the Wi-Fi operations in the ISM band 516 and may experience potential interference/desensing cross-device coexistence impacts from the LTE 23 dBm aggressor may be referred to as a "Wi-Fi victim."

As shown in the graph depicted at 510, an interference level 518 that the Wi-Fi victim experiences due to the operations that the LTE 23 dBm aggressor conducts on any particular channel within the depicted released spectrum portion 512 within the B40 band may vary depending on a distance 520 from the LTE 23 dBm aggressor to the Wi-Fi victim, wherein the interference level 518 that the Wi-Fi victim experiences may generally increase as the distance 520 from the LTE 23 dBm aggressor to the Wi-Fi victim decreases. Furthermore, a desensitization level 522 experienced at the Wi-Fi victim may generally increase as the released spectrum portion 512 that the LTE 23 dBm aggressor uses to conduct the LTE operations approaches the guard band between the released spectrum portion 512 in the B40 band and the ISM band 516. Accordingly, as depicted at 524, the Wi-Fi victim may experience increasing desense as the distance 520 from the LTE 23 dBm aggressor to the Wi-Fi victim decreases, and may experience further increased desense as the LTE operations associated with the LTE 23 dBm aggressor are conducted at higher frequencies within the released spectrum portion 512 within the B40 band.

However, those skilled in the art will appreciate that the cross-device coexistence impacts that may result from different wireless devices conducting operations in various frequency bands and/or using various RATs may vary depending on various factors. For example, the graph depicted at 530 generally illustrates cross-device coexistence impacts where another wireless device ("Device B") having a different WLAN receiver experiences desensitization from a 5 MHz wide TDD LTE interferer at a ~20 meter distance. In particular, the graph shown at 530 may depict experimental results in which the vertical axis represents increasing desensitization levels at Device B, wherein the desensitization levels may vary depending on a center frequency offset from a low band edge in the ISM band 516 and a distance from the TDD LTE interferer to Device B. For example, as depicted at 532, Device B may start to experience a desensitization level over ~10 dB where the TDD LTE interferer uses a 2.5 MHz center frequency offset from the low band edge in the ISM band 516 and a distance 536 from Device B to the TDD LTE interferer is ~22 meters. Furthermore, at a ~6 meter distance from the TDD LTE interferer, Device B may start to experience a desensitization level over ~10 dB where the TDD LTE interferer uses a ~30.0 MHz center frequency offset from the low band edge in the ISM band 516, a desensitization level over ~30 dB where the TDD LTE interferer uses a ~15.0 MHz center frequency offset from the low band edge in the ISM band 516, and so on.

Accordingly, referring again to FIG. 3, the following description provides various solutions that may be used to identify a best RAT to use in establishing the D2D connection due to the possibility that the wireless devices 310, 320 may each support one or several RATs that can be used to establish a D2D connection. As such, depending on the radio configuration associated with the wireless devices 310, 320 and the available RAT options that can be used to establish the D2D connection, the solutions described herein may involve a negotiation between the wireless devices 310, 320 to select the best RAT and/or multi-radio parameters to use when establishing the D2D connection based on one or more criteria that may relate to performance, power, in-device coexistence impacts, cross-device coexistence impacts, and/or preferences (e.g., user preferences, device preferences, operator preferences, etc.). For example, in certain use cases, a particular RAT may not be available or optimal with respect to a particular D2D connection even though both wireless devices 310, 320 may support the particular RAT (e.g., where the wireless devices 310, 320 are associated with different manufacturers that implement the RAT in different ways, where one RAT may be unable to provide sufficient performance with respect to the requirements associated with a particular application or session, where using a particular RAT may cause in-device and/or cross-device coexistence impacts, etc.). As such, in various embodiments, the wireless devices 310, 320 may each have a respective coexistence manager 318, 328 in addition to a respective policy database 319, 329, wherein the wireless devices 310, 320 may run a D2D coexistence protocol to mutually negotiate the "best" RAT to use in establishing a D2D connection.

In various embodiments, the wireless devices 310, 320 may therefore run the D2D coexistence protocol to learn a radio configuration and radio capabilities associated with one another and thereby identify one or more "compatible" RATs that can be used to establish the D2D connection, wherein the term "compatible" as used herein may refer to the ability to establish a D2D connection according to the local version(s) of the D2D RATs that are implemented on the respective wireless devices 310, 320 (i.e., the term "compatible" as used herein means more than the mere ability to establish a connection according to an established standard such as Wi-Fi). For example, where the wireless devices 310, 320 correspond to smartphones from different manufacturers that implement different Wi-Fi Direct versions, the "compatible" D2D RATs may not include Wi-Fi Direct in the event that the wireless devices 310, 320 cannot communicate using respective local Wi-Fi Direct versions even though both wireless devices 310, 320 support Wi-Fi Direct as a possible D2D RAT. Accordingly, in various embodiments, the wireless devices 310, 320 may exchange the radio configuration and radio capabilities associated with one another to learn the compatible D2D RATs that can be used to establish the D2D connection (i.e., the possible RATs that the wireless devices 310, 320 can use to establish the D2D connection using locally implemented versions on the respective wireless devices 310, 320) and further to learn a multi-radio coexistence state associated with each other. For example, in various embodiments, the multi-radio coexistence state exchanged between the wireless devices 310, 320 may comprise in-device coexistence impacts and/or cross-device coexistence impacts measured at each respective wireless device 310, 320).

In various embodiments, the wireless devices 310, 320 may then mutually negotiate the best RAT to establish the D2D connection based on the compatible D2D RATs and the multi-radio coexistence state(s) exchanged according to the D2D coexistence protocol. For example, in various embodiments, the wireless device 310 may attempt to engage D2D communications with the wireless device 320 according to each locally supported D2D RAT (e.g., the wireless device 310 may attempt to engage NFC connectivity via the NFC radio 311, LTE Direct connectivity via the WWAN radio 313, Wi-Fi Direct connectivity via the WLAN radio 315, Bluetooth connectivity via the Bluetooth radio 317, etc.). As such, if the wireless device 310 determines that all locally supported D2D RATs failed to achieve connectivity, the D2D coexistence protocol may fail without establishing a D2D connection with the wireless device 320. However, if the wireless device 310 determines that one or more locally supported D2D RATs successfully achieved connectivity such that there are one or more compatible D2D RATs, the wireless devices 310, 320 may then negotiate one or more best D2D RATs to use in establishing the D2D connection. For example, in the simplest use case, only one D2D RAT may be successful in achieving connectivity between the wireless devices 310, 320, whereby the wireless devices 310, 320 may establish a D2D connection according to that D2D RAT.

However, where multiple D2D RATs succeeded in achieving connectivity, the wireless devices 310, 320 may mutually negotiate or otherwise select one or more best D2D RATs according to one or more criteria that relate to performance, power, in-device coexistence impacts, cross-device coexistence impacts, preferences, policies, and/or other suitable factors. For example, where the multiple D2D RATs that successfully achieved connectivity comprise Bluetooth and LTE Direct, the wireless devices 310, 320 may select Bluetooth, LTE Direct, or both depending on criteria that relate to performance metrics (e.g., use Bluetooth if the D2D connection is established to transfer a file having a small size, use LTE Direct if the D2D connection is established to transfer a large file because LTE Direct offers faster transfer speeds than Bluetooth, use both if the wireless devices 310, 320 are more than a few meters apart such that the LTE Direct connection can take over in the event that the Bluetooth connection between the wireless devices 310, 320 is lost, etc.). In another example, the wireless devices 310, 320 may select one or more best D2D RATs to minimize power consumption, which may comprise selecting the fastest D2D link (e.g., preferring Wi-Fi Direct over LTE Direct) under the "race-to-idle" principle in which transmissions are conducted as quickly as possible before returning the radios to an inactive idle state. In another scenario, one D2D RAT may consume significantly more active power than another such that the more power-hungry D2D RAT may simply not be considered at a high priority (e.g., Wi-Fi and/or LTE radios typically use more power than Bluetooth and/or NFC). More generally, in scenarios where the optimization metric pertains to selecting a high-performance interface (e.g., to transfer a large file, conduct a D2D session that involves a service with latency or other quality of service constraints, etc.), both the "race-to-idle" and "active power consumption" factors may be considered when selecting the one or more best D2D RATs. However, where a small file is to be transferred or the context otherwise does not require a high-performance interface, then Bluetooth and/or BTLE may simply be considered the best D2D RAT, unless there are potential in-device and/or cross-device coexistence impacts and/or other considerations that may make Bluetooth and/or BTLE undesirable (e.g., not concurrently participating in other links such as to a wireless headset or wireless speakers).

In still other examples, operator policies may be considered, wherein operator policies may generally exist at least when one or more LTE channels are selected for D2D communications, as opposed to Wi-Fi. As such, if the operator associated with either or both wireless devices 310, 320 determines that using a given spectrum in a particular area may not be enabled for some reason, the operator may disable LTE Direct in the policy database 319, 329 associated with the applicable wireless device(s) 310, 320 (e.g., where the wireless device(s) 310, 320 have not paid a fee to enable LTE Direct, where given spectrum channels are potentially limited to help alleviate network or other conditions in a local area). Furthermore, similar issues may arise in use cases that involve operator-controlled Wi-Fi, which may come with similar access or subscription-based use such that Wi-Fi may be disabled as a possible D2D RAT in a given region. In another example where an operator policy may be considered in negotiating the best D2D RAT(s), a particular operator may prefer that the wireless devices 310, 320 communicate over LTE Direct and/or using operator-controlled Wi-Fi to monetize airtime over free Wi-Fi and/or other free D2D RATs or vice versa (e.g., where the cellular network and/or the operator-controlled Wi-Fi network is at capacity and other D2D RATs are therefore preferred).

Furthermore, according to various embodiments, the wireless devices 310, 320 may further mutually negotiate certain modified radio parameters where the "best" D2D RAT mutually negotiated between the wireless devices 310, 320 has the potential to cause in-device and/or cross-device coexistence impacts. In particular, the wireless devices 310, 320 may mutually negotiate the modified radio parameters in an effort to eliminate, reduce, or at least mitigate the potential in-device and/or cross-device coexistence impacts and the wireless devices 310, 320 may then attempt to establish the D2D connection according to the best D2D RAT if the modified radio parameters sufficiently eliminate, reduce, or otherwise mitigate the potential in-device and/or cross-device coexistence impacts. Alternatively, where the modified radio parameters do not sufficiently reduce the in-device and/or cross-device coexistence impacts, the wireless devices 310, 320 may attempt one or more next best D2D RATs until the in-device and/or cross-device coexistence impacts has been sufficiently reduced and then establish the D2D connection according to the multi-radio configuration that provides the best in-device and cross-device coexistence operating parameters. Accordingly, as will be described in further detail below with respect to FIG. 6 and FIG. 7, the following table illustrates various example scenarios in which the wireless devices 310, 320 may mutually negotiate and select a D2D RAT.

TABLE 1

D2D Link Selection Scenarios

| Problem | D2D Link Options | Metric | D2D RAT Selection |
|---|---|---|---|
| Incompatible RAT (e.g., Wi-Fi Direct) | One (e.g., LTE Direct) | Small File Size | LTE Direct |
| Incompatible RAT (e.g., Wi-Fi Direct) | Multiple (e.g., Bluetooth and LTE Direct) | Small File Size | Bluetooth |
| Incompatible RAT (e.g., Wi-Fi Direct) | Multiple (e.g., Bluetooth and LTE Direct) | Large File Size | LTE Direct |
| In-Device Coexistence | Multiple (e.g., NFC, Bluetooth, Wi-Fi Direct, and LTE Direct) | Not Specified | Best Coexistence Performance |
| Cross-Device Coexistence | Multiple (e.g., NFC, Bluetooth, Wi-Fi Direct, and LTE Direct) | Not Specified | Best Coexistence Performance |

Figure 6:
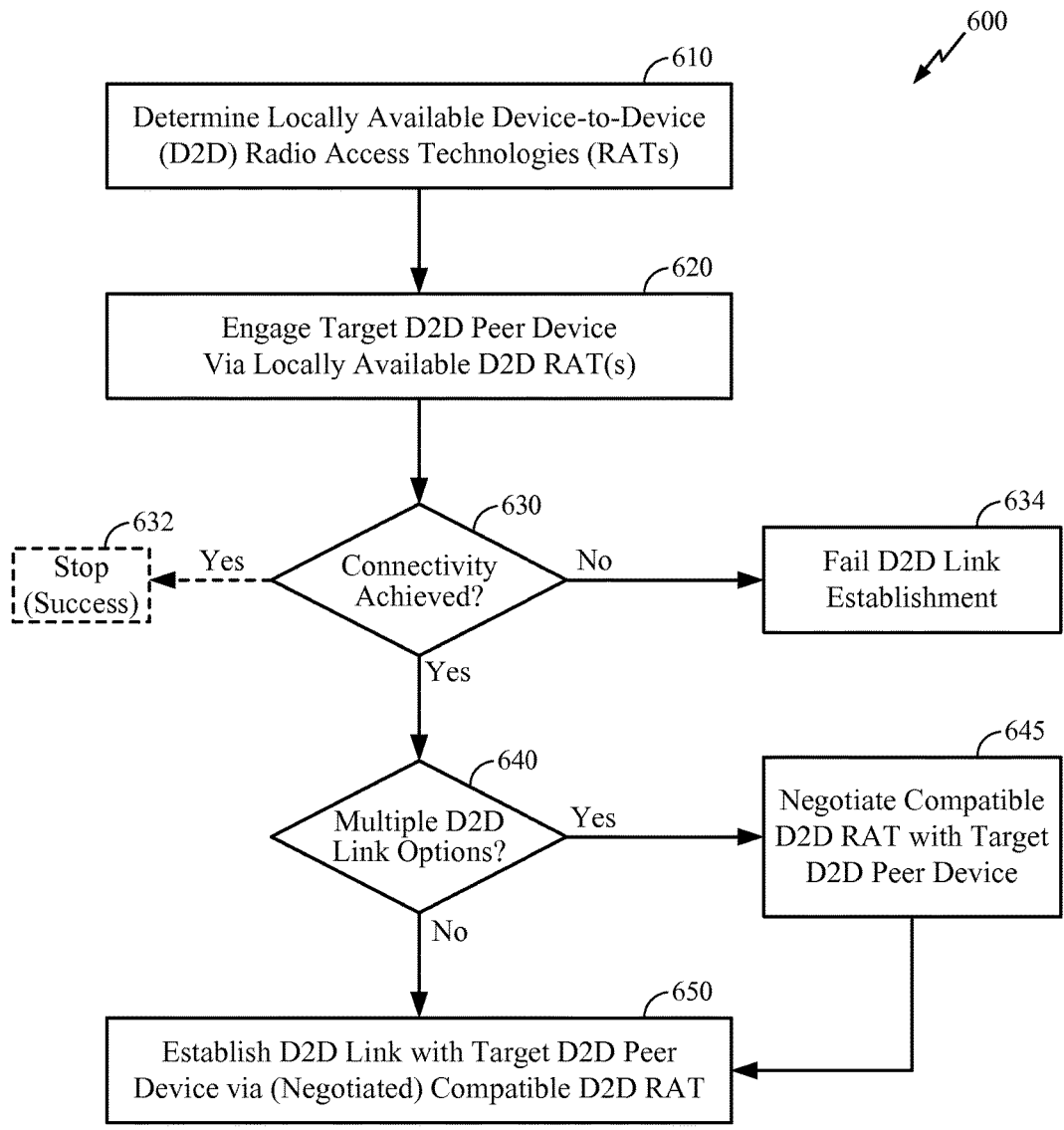
FIG. 6 illustrates an example methodology to negotiate a best RAT to use in establishing a D2D connection between two peer devices, according to various aspects.

According to various aspects, FIG. 6 illustrates an example methodology 600 to negotiate a best RAT to use in establishing a D2D connection between two peer devices. In particular, at block 610, a first wireless device may determine one or more locally available device-to-device (D2D) RATs. For example, the first wireless device may support D2D RATs that include NFC, Bluetooth, Wi-Fi Direct, and LTE Direct, although Wi-Fi Direct may be excluded from the locally available D2D RATs in the event that the first wireless device determines that a Wi-Fi radio has been turned off. Accordingly, the locally available D2D RATs that are determined at block 610 may generally depend on the D2D RATs that are supported on the first wireless device in addition to any applicable user, device, and/or operator preferences (e.g., a user may define a preference to avoid using LTE Direct when other D2D RATs are possible to avoid incurring data charges).

In various embodiments, at block 620, the first wireless device may then engage the target D2D peer device via the locally available D2D RAT(s) and then determine whether at least one locally available D2D RAT successfully achieved connectivity with the target D2D peer device at block 630. For example, in various embodiments, the first wireless device may engage the target D2D peer device via each locally available D2D RAT, which may be done consecutively or in parallel (e.g., depending on an original equipment manufacturer (OEM) configuration, a policy-based configuration, and/or other suitable criteria). Alternatively, in various embodiments, the first wireless device may derive a priority list that orders the locally available D2D RATs according to policy, priority, and/or other criteria. In such a use case, at block 620, the first wireless device may sequentially attempt to engage the target D2D peer device via the locally available D2D RATs according to the ordered priority list and then stop at the first D2D RAT in the ordered priority list that succeeds in achieving connectivity with the target D2D peer device at block 632. For example, in either case, the first wireless device and the target D2D peer device may each support Wi-Fi Direct and LTE Direct, but Wi-Fi Direct may nonetheless fail to successfully achieve connectivity in certain use cases due to proprietary limitations (e.g., when the first wireless device and the target D2D peer device are associated with different manufacturers). As such, in response to determining that connectivity with the target D2D peer device could not be achieved at block 630, the D2D link establishment between the first wireless device and the target D2D peer device may fail at block 634. Alternatively, if at least one locally available D2D RAT successfully achieved connectivity with the target D2D peer device, the potential D2D peer devices may then determine whether one or multiple D2D link options are available at block 640. For example, where Wi-Fi Direct failed to achieve connectivity (e.g., due to proprietary limitations) and NFC and Bluetooth also failed to achieve connectivity (e.g., due to the first wireless device and the target D2D peer device not being within sufficient proximity) but LTE Direct successfully achieved connectivity, the potential D2D peer devices may discover at block 640 that the mobile network operator (MNO) controlled LTE Direct standard is the only available D2D link option.

Accordingly, in response to discovering at block 640 that only one D2D RAT successfully achieved connectivity, the first wireless device and the target D2D peer device may then establish a D2D link at block 650 via the only available compatible D2D RAT. Alternatively, in response to discovering at block 640 that multiple D2D RATs successfully achieved connectivity, the first wireless device and the target D2D peer device may then negotiate a compatible D2D RAT at block 645 prior to establishing the D2D link via the negotiated compatible D2D RAT at block 650. For example, in response to determining at block 640 that Bluetooth and LTE Direct successfully achieved connectivity, the first wireless device may suggest a Bluetooth link at block 645 if the D2D link is established to transfer a file having a small size or alternatively suggest an LTE Direct link at block 645 if the D2D link is established to transfer a file having a large size. In other examples, as will be described in further detail below with respect to FIG. 7, the negotiation conducted at block 645 may be used to select a compatible RAT that may best mitigate in-device and/or cross-device coexistence issues. In any case, once the potential D2D peer devices negotiate the compatible D2D RAT at block 645, the first wireless device and the target D2D peer device may then establish the D2D link at block 650 via the negotiated compatible D2D RAT and exchange data over the established D2D link.

Figure 7:
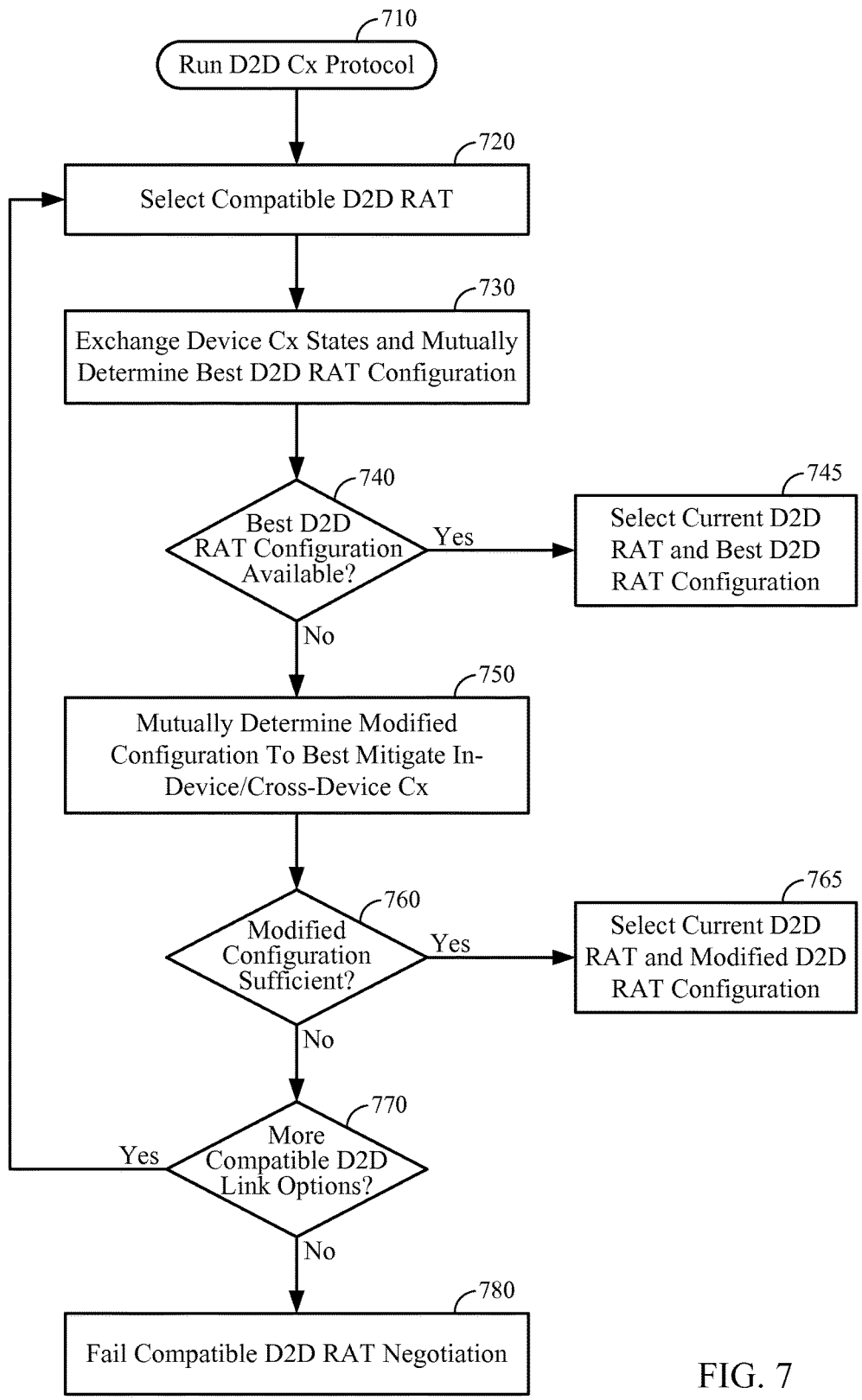
FIG. 7 illustrates another example methodology to negotiate a best RAT to use in establishing a D2D connection between two peer devices in a manner that may mitigate in-device and cross-device coexistence impacts, according to various aspects.

According to various aspects, FIG. 7 illustrates another example methodology 700 to negotiate a best RAT to use in establishing a D2D connection between two peer devices in a manner that may mitigate in-device and cross-device coexistence impacts, wherein the methodology 700 shown in FIG. 7 may generally correspond to one example negotiation that may occur at block 645 as shown in FIG. 6. In the following description, the two peer devices may be assumed to comprise a first wireless device that comprises a WLAN radio conducting Wi-Fi operations at 2.4 GHz on channel 6 to a first access point, a Bluetooth radio conducting Bluetooth operations, and a WWAN radio conducting LTE operations in the B40 band in addition to a second wireless device that comprises a WLAN radio conducting Wi-Fi operations at 2.4 GHz on channel 1 to a second access point, a Bluetooth radio conducting Bluetooth operations, and a WWAN radio conducting 3G cellular operations. In that context, the 2.4 GHz that the first wireless device and the second wireless device use to conduct the respective Wi-Fi operations may generally be divided into 14 channels that are spaced 5 MHz apart, starting at channel 1 centered at 2.412 GHz. Accordingly, the first wireless device conducting 2.4 GHz Wi-Fi operations on channel 6 may operate at a 2.437 GHz center frequency, while the second wireless device conducting 2.4 GHz Wi-Fi operations on channel 1 may operate at a 2.412 GHz center frequency, and the first wireless device and the second wireless device may each have multi-radio coexistence parameters chosen to optimize local operations.

In various embodiments, at block 710, the first wireless device and the second wireless device may each run a D2D coexistence protocol, which may comprise initially selecting a compatible D2D RAT at block 720. The first and second wireless devices may then conduct service discovery to exchange device coexistence states and mutually determine a best configuration associated with the current D2D RAT at block 730. For example, assuming that the initially selected D2D RAT is Wi-Fi Direct, the first and second wireless devices may mutually determine that Wi-Fi at 5 GHz is best (e.g., because the 5 GHz band may alleviate the coexistence problems due to being comparatively far away from other radios). In that context, various IEEE 802.11 standards add multiple-input multiple-output (MIMO) antenna support to operate on both the 2.4 GHz band and the lesser-used 5 GHz band that can operate at higher maximum data rates, wherein the dual-band feature may or may not be supported on certain devices. As such, in the above-mentioned example where the first and second wireless devices mutually determine that Wi-Fi at 5 GHz is best, the service discovery conducted between the first and second wireless devices may reveal that both wireless devices support the dual-band feature that allows the wireless devices to conduct Wi-Fi operations in the 5 GHz band. Accordingly, in various embodiments, the first and second wireless devices may determine whether the best D2D RAT configuration is available at block 740, which may depend on whether both devices can support the best D2D RAT configuration, whether the best D2D RAT configuration causes in-device and/or cross-device coexistence impacts at either wireless device, and/or other factors. In various embodiments, in response to the first and second wireless devices determining that the best D2D RAT configuration is available, the first and second wireless devices may then select the current D2D RAT and establish a D2D connection according to the best configuration associated therewith at block 745.

Alternatively, in response to the first and second wireless devices determining that the best D2D RAT configuration is not available (e.g., where the wireless devices are forced to use 2.4 GHz Wi-Fi because 5 GHz Wi-Fi is unsupported), the first and second wireless devices may then mutually determine a modified configuration associated with the current D2D RAT to best mitigate in-device and/or cross-device coexistence impacts and adjust respective multi-radio configurations associated therewith accordingly at block 750. For example, the modified configuration may comprise a mutual determination that the best modified configuration is to (i) select Wi-Fi channel 11 causes the least in-device and/or cross-device coexistence impact on the LTE operations that the first wireless device conducts in the B40 band, (ii) instruct the first wireless device to reduce transmit power to back off Wi-Fi transmit power to the second wireless device by a certain number of decibels (dB), and (iii) instruct a Bluetooth radio to adjust Adaptive Frequency Hopping (AFH) patterns accordingly. In various embodiments, the first and second wireless devices may then determine whether the modified (adjusted) multi-radio configuration sufficiently mitigates any in-device and/or cross-device coexistence impacts on the current D2D RAT, in which case the first and second wireless devices may then select the current D2D RAT and establish a D2D connection according to the modified multi-radio configuration at block 765. Otherwise, if the modified multi-radio configuration does not sufficiently mitigate the in-device and/or cross-device coexistence impacts on the current D2D RAT, the first and second wireless devices may determine whether any further compatible D2D link options are available at block 770. In the affirmative, the methodology 700 may return to block 720 and the first and second wireless devices may attempt to establish a D2D connection on the next compatible D2D RAT in a substantially similar manner to that described above until a D2D RAT that sufficiently satisfies performance and in-device and cross-device coexistence requirements has been met, or in the alternative, the compatible D2D RAT negotiation may fail at block 780 if the first and second wireless devices exhaust all compatible D2D RAT options without finding at least one compatible D2D RAT that sufficiently satisfies performance and in-device and cross-device coexistence requirements.

Figure 8:
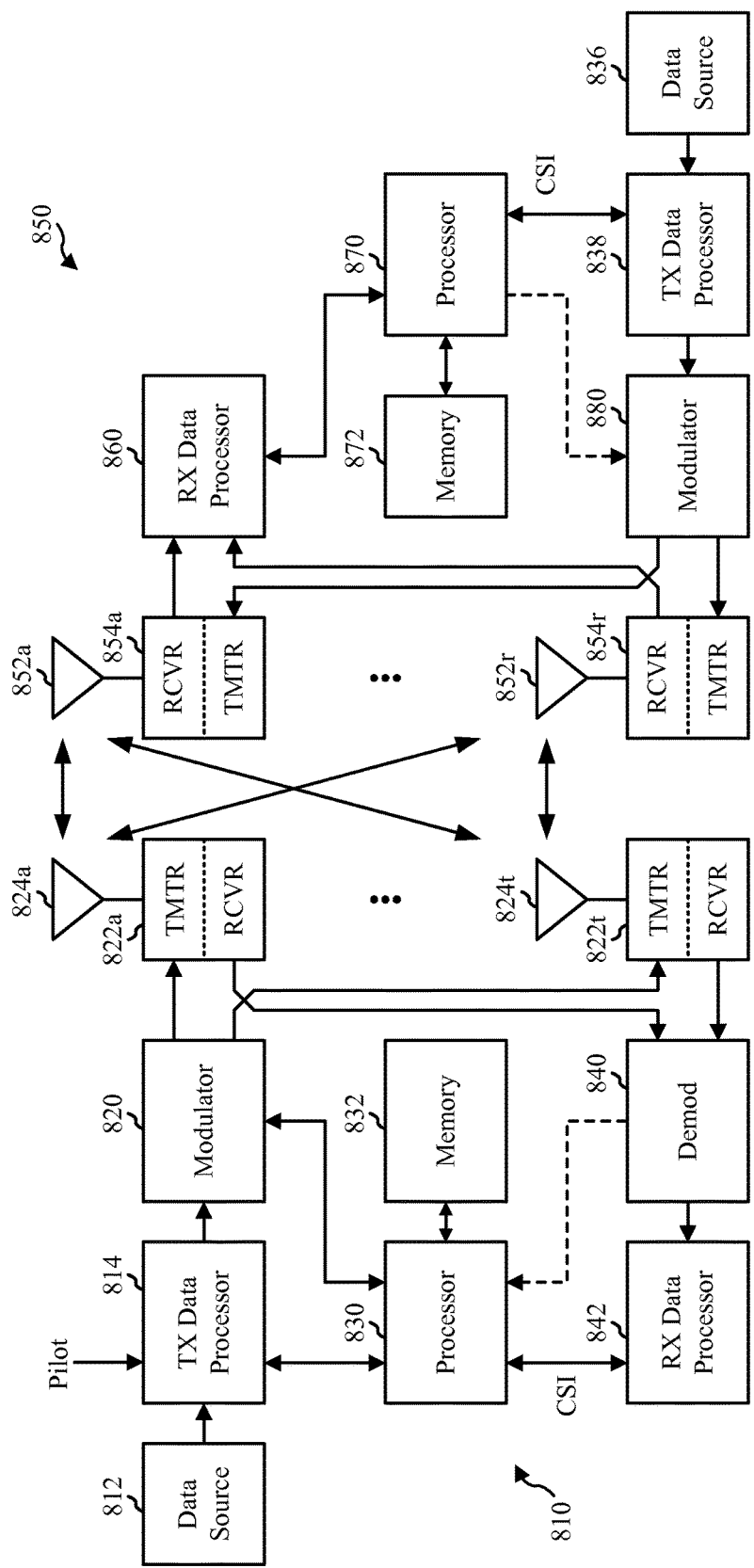
FIG. 8 illustrates a block diagram that may correspond to two peer devices that may engage in D2D communications, according to various aspects.

According to various aspects, FIG. 8 illustrates a block diagram that may correspond to two peer devices that may engage in D2D communications. In the following description, FIG. 8 will be explained in a context where a first peer device 810 transmits data to a second peer device 850 over a D2D connection and the second peer device 850 receives the data transmitted from the first peer device 810 over the D2D connection. However, those skilled in the art will appreciate that the transmit and receive functions may also be reversed, in that the second peer device 850 can transmit data to the first peer device 810 over the D2D connection and the first peer device 810 can receive data transmitted from the second peer device 850 over the D2D connection in substantially the same manner. Accordingly, in the example shown in FIG. 8, both the first peer device 810 and the second peer device 850 may have a transceiver that includes a transmitter system and a receiver system. At the first peer device 810, traffic data for a number of data streams is provided from a data source 812 to a transmit (TX) data processor 814.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S$ is less than or equal to $\min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the transmitting peer device to extract transmit beamforming gain on the downlink when multiple antennas are available at the transmitting peer device. In one aspect, each data stream is transmitted over a respective transmit antenna. The TX data processor 814 formats, codes, and interleaves the traffic data for each data stream based on a particular coding scheme selected for that data stream to provide coded data. The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 830 operating with a memory 832.

The modulation symbols for respective data streams are then provided to a TX MIMO processor 820, which can further process the modulation symbols (e.g., for OFDM). The TX MIMO processor 820 then provides $N_T$ modulation symbol streams to $N_T$ transmitters (TMTR) 822a through 822t. In certain aspects, the TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 822a through 822t are then transmitted from $N_T$ antennas 824a through 824t, respectively.

At the receiving peer device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and down-converts) a respective received signal, digitizes the conditioned signal to provide samples, and further processes the samples to provide a corresponding "received" symbol stream. An RX data processor 860 then receives and processes the $N_R$ received symbol streams from $N_R$ receivers 854 based on a particular receiver processing technique to provide $N_R$ "detected" symbol streams. The RX data processor 860 then demodulates, deinterleaves, and decodes each detected symbol stream to recover the traffic data for the data stream. The processing by the RX data processor 860 is complementary to the processing performed by the TX MIMO processor 820 and the TX data processor 814 at the first peer device 810.

A processor 870 (operating with a memory 872) periodically determines which pre-coding matrix to use (discussed below). The processor 870 formulates an uplink message having a matrix index portion and a rank value portion.

The uplink message can include various types of information regarding the communication link and/or the received data stream. The uplink message is then processed by a TX data processor 838, which also receives traffic data for a number of data streams from a data source 836, modulated by a modulator 880, conditioned by transmitters 854a through 854r, and transmitted back to the first peer device 810. At the first peer device 810, the modulated signals from the receiver system 850 are received by antennas 824, conditioned by receivers 822, demodulated by a demodulator 840, and processed by an RX data processor 842 to extract the uplink message transmitted by the receiver system 850. The processor 830 then determines which pre-coding matrix to use for determining the beamforming weights, then processes the extracted message Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for selecting a radio access technology (RAT) to use in a device-to-device (D2D) connection, comprising:
   requesting, by a first wireless device, a radio configuration from a second wireless device, wherein the requested radio configuration comprises a coexistence state and one or more radio capabilities associated with the second wireless device;

receiving, at the first wireless device, the coexistence state and the one or more radio capabilities from the second wireless device;

negotiating one or more compatible RATs available to use in a D2D connection between the first wireless and the second wireless device according to at least the coexistence state and the one or more radio capabilities received from the second wireless device, wherein the negotiating comprises exchanging in-device and cross-device coexistence states between the first wireless device and the second wireless device; and establishing one or more D2D connections between the first wireless device and the second wireless device using the negotiated one or more compatible RATs.

2. The method recited in claim 1, wherein negotiating the one or more compatible RATs further comprises:

determining that at least one of the compatible RATs causes in-device interference at one or more of the first wireless device or the second wireless device based on the exchanged in-device and cross-device coexistence states;

negotiating a modified configuration associated with the at least one compatible RAT to mitigate the in-device interference; and adjusting a multi-radio configuration at the first wireless device according to the negotiated modified configuration associated with the at least one compatible RAT.

3. The method recited in claim 2, wherein the second wireless device is configured to adjust the radio configuration associated therewith according to the modified configuration.

4. The method recited in claim 1, wherein negotiating the one or more compatible RATs further comprises:

determining that at least one of the compatible RATs causes cross-device interference at one or more of the first wireless device or the second wireless device based on the exchanged in-device and cross-device coexistence states; and negotiating a modified configuration associated with the at least one compatible RAT to mitigate the cross-device interference; and adjusting a multi-radio configuration at the first wireless device according to the negotiated modified configuration associated with the at least one compatible RAT.

5. The method recited in claim 4, wherein the second wireless device is configured to adjust the radio configuration associated therewith according to the modified configuration.

6. The method recited in claim 1, wherein negotiating the one or more compatible RATs further comprises:

determining that one compatible RAT is available to use in the D2D connection between the first wireless and the second wireless device, wherein the one or more D2D connections between the first wireless device and the second wireless device comprise one D2D connection established according to the one compatible RAT.

7. The method recited in claim 1, wherein negotiating the one or more compatible RATs further comprises:

determining that multiple compatible RATs are available to use in the D2D connection between the first wireless and the second wireless device; and selecting one or more of the multiple compatible RATs to meet a performance requirement associated with the D2D connection.

8. The method recited in claim 7, further comprising:

deriving a priority list that orders the multiple compatible RATs according to one or more policies that are based on one or more of a user preference, a device state, or a mobile network operator preference, wherein the one or more of the multiple compatible RATs are further selected according to the derived priority list.

9. The method recited in claim 1, wherein the one or more compatible RATs are negotiated according to one or more policies that are based on one or more of a user preference, a device state, or a mobile network operator preference.

10. The method recited in claim 1, wherein the one or more compatible RATs comprise one or more of LTE Direct, Wi-Fi Direct, Bluetooth, or Near Field Communication.

11. A wireless device, comprising:

multiple radios that each support a different radio access technology (RAT);

a transmitter configured to transmit a request to a target peer wireless device;

a receiver configured to receive a coexistence state and one or more radio capabilities associated with the target peer wireless device in response to the transmitted request; and one or more processors configured to:

exchange in-device and cross-device coexistence states between the wireless device and the target peer wireless device;

negotiate one or more compatible RATs available to use in a device-to-device (D2D) connection between the wireless and the target peer wireless device according to the exchanged in-device and cross-device coexistence states; and establish one or more D2D connections between the wireless device and the target peer wireless device using the negotiated one or more compatible RATs.

12. The wireless device recited in claim 11, wherein the one or more processors are further configured to:

determine that at least one of the compatible RATs causes in-device interference at one or more of the wireless device or the target peer wireless device based on the exchanged in-device and cross-device coexistence states;

negotiate a modified configuration associated with the at least one compatible RAT to mitigate the in-device interference; and adjust a multi-radio configuration at the wireless device according to the negotiated modified configuration associated with the at least one compatible RAT.

13. The wireless device recited in claim 12, wherein the target peer wireless device is further configured to adjust the radio configuration associated therewith according to the modified configuration.

14. The wireless device recited in claim 11, wherein the one or more processors are further configured to:

determine that at least one of the compatible RATs causes cross-device interference at one or more of the wireless device or the target peer wireless device based on the exchanged in-device and cross-device coexistence states; and negotiate a modified configuration associated with the at least one compatible RAT to mitigate the cross-device interference; and adjust a multi-radio configuration at the wireless device according to the negotiated modified configuration associated with the at least one compatible RAT.

15. The wireless device recited in claim 14, wherein the target peer wireless device is further configured to adjust the radio configuration associated therewith according to the modified configuration.

16. The wireless device recited in claim 11, wherein the one or more processors are further configured to:
    determine that one compatible RAT is available to use in the D2D connection between the wireless and the target peer wireless device, wherein the one or more D2D connections between the wireless device and the target peer wireless device comprise one D2D connection established according to the one compatible RAT.

17. The wireless device recited in claim 11, wherein the one or more processors are further configured to:
    determine that multiple compatible RATs are available to use in the D2D connection between the wireless and the target peer wireless device; and
    select one or more of the multiple compatible RATs to meet a performance requirement associated with the D2D connection.

18. The wireless device recited in claim 17, wherein the one or more processors are further configured to:
    derive a priority list that orders the multiple compatible RATs according to one or more policies that are based on one or more of a user preference, a device state, or a mobile network operator preference and select the one or more of the multiple compatible RATs according to the derived priority list.

19. An apparatus, comprising:
    means for requesting a radio configuration from a target peer wireless device, wherein the requested radio configuration comprises a coexistence state and one or more radio capabilities associated with the target peer wireless device;
    means for receiving the coexistence state and the one or more radio capabilities from the target peer wireless device;
    means for negotiating one or more compatible radio access technologies (RATs) available to use in a device-to-device (D2D) connection with the target peer wireless device according to at least the coexistence state and the one or more radio capabilities received from the target peer wireless device, wherein the means for negotiating comprises means for exchanging in-device and cross-device coexistence states with the target peer wireless device; and
    means for establishing one or more D2D connections with the target peer wireless device using the negotiated one or more compatible RATs.

20. The apparatus recited in claim 19, wherein the means for negotiating the one or more compatible RATs further comprises:
    means for determining that at least one of the compatible RATs causes in-device interference at one or more of the apparatus or the target peer wireless device based on the exchanged in-device and cross-device coexistence states;
    means for negotiating a modified configuration associated with the at least one compatible RAT to mitigate the in-device interference; and
    means for adjusting a multi-radio configuration according to the negotiated modified configuration associated with the at least one compatible RAT.

21. The apparatus recited in claim 19, wherein the means for negotiating the one or more compatible RATs comprises:
    means for determining that at least one of the compatible RATs causes cross-device interference at one or more of the apparatus or the target peer wireless device based on the exchanged in-device and cross-device coexistence states; and
    means for negotiating a modified configuration associated with the at least one compatible RAT to mitigate the cross-device interference; and
    means for adjusting a multi-radio configuration according to the negotiated modified configuration associated with the at least one compatible RAT.

22. The apparatus recited in claim 19, wherein the means for negotiating the compatible RAT comprises:
    means for determining that one compatible RAT is available to use in the D2D connection with the target peer wireless device, wherein the one or more D2D connections with the target peer wireless device comprise one D2D connection established according to the one compatible RAT.

23. The apparatus recited in claim 19, wherein the means for negotiating the one or more compatible RATs further comprises:
    means for determining that multiple compatible RATs are available to use in the D2D connection with the target peer wireless device; and
    means for selecting one or more of the multiple compatible RATs to meet a performance requirement associated with the D2D connection.

24. The apparatus recited in claim 23, further comprising:
    means for deriving a priority list that orders the multiple compatible RATs according to one or more policies that are based on one or more of a user preference, a device state, or a mobile network operator preference, wherein the one or more of the multiple compatible RATs are further selected according to the derived priority list.

25. A non-transitory computer-readable storage medium having computer-executable instructions recorded thereon, wherein executing the computer-executable instructions on a wireless device having one or more processors causes the one or more processors to:
    request a radio configuration from a target peer wireless device, wherein the requested radio configuration comprises a coexistence state and one or more radio capabilities associated with the target peer wireless device;
    receive the coexistence state and the one or more radio capabilities from the target peer wireless device;
    negotiate one or more compatible radio access technologies (RATs) available to use in a device-to-device (D2D) connection with the target peer wireless device according to at least the coexistence state and the one or more radio capabilities received from the target peer wireless device and in-device and cross-device coexistence states exchanged with the target peer wireless device; and
    establish one or more D2D connections with the target peer wireless device using the negotiated one or more compatible RATs.

26. The non-transitory computer-readable storage medium recited in claim 25, wherein executing the computer-executable instructions on the wireless device further causes the one or more processors to:
    determine that at least one of the compatible RATs causes in-device interference at one or more of the wireless device or the target peer wireless device based on the exchanged in-device and cross-device coexistence states;
    negotiate a modified configuration associated with the at least one compatible RAT to mitigate the in-device interference; and
    adjust a multi-radio configuration according to the negotiated modified configuration associated with the at least one compatible RAT.

27. The non-transitory computer-readable storage medium recited in claim 25, wherein executing the computer-executable instructions on the wireless device further causes the one or more processors to:
- determine that at least one of the compatible RATs causes cross-device interference at one or more of the wireless device or the target peer wireless device based on the exchanged in-device and cross-device coexistence states; and
- negotiate a modified configuration associated with the at least one compatible RAT to mitigate the cross-device interference; and
- adjust a multi-radio configuration according to the negotiated modified configuration associated with the at least one compatible RAT.

28. The non-transitory computer-readable storage medium recited in claim 25, wherein executing the computer-executable instructions on the wireless device further causes the one or more processors to:
- determine that one compatible RAT is available to use in the D2D connection with the target peer wireless device, wherein the one or more D2D connections with the target peer wireless device comprise one D2D connection established according to the one compatible RAT.

29. The non-transitory computer-readable storage medium recited in claim 25, wherein executing the computer-executable instructions on the wireless device further causes the one or more processors to:
- determine that multiple compatible RATs are available to use in the D2D connection with the target peer wireless device; and
- select one or more of the multiple compatible RATs to meet a performance requirement associated with the D2D connection.

30. The non-transitory computer-readable storage medium recited in claim 29, wherein executing the computer-executable instructions on the wireless device further causes the one or more processors to:
- derive a priority list that orders the multiple compatible RATs according to one or more policies that are based on one or more of a user preference, a device state, or a mobile network operator preference and select the one or more of the multiple compatible RATs according to the derived priority list.

* * * * *